No. 685,671. Patented Oct. 29, 1901.
L. S. BURBANK.
APPARATUS FOR COOKING AND DRYING.
(Application filed Dec. 21, 1899.)
(No Model.)
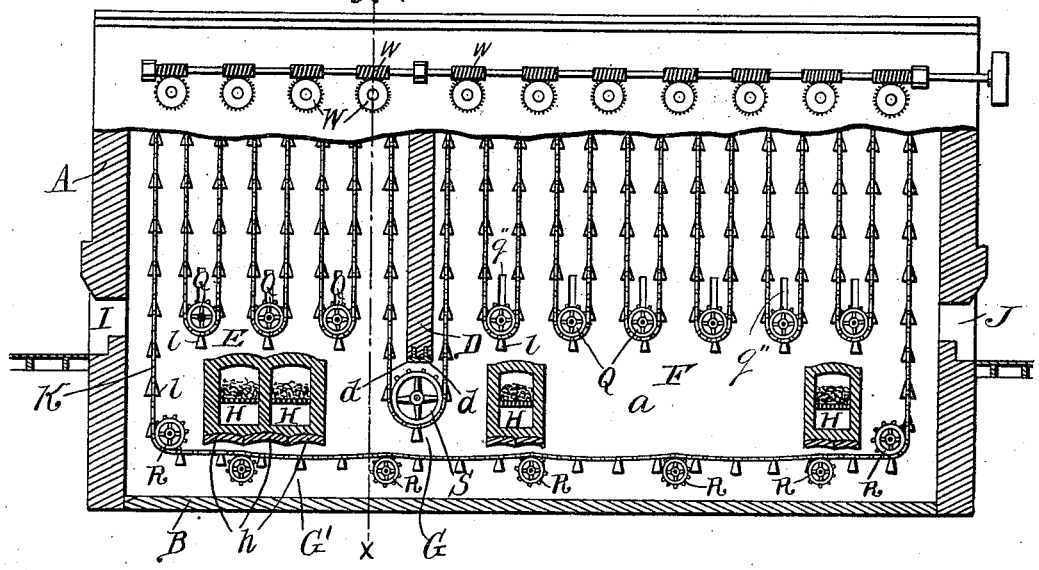
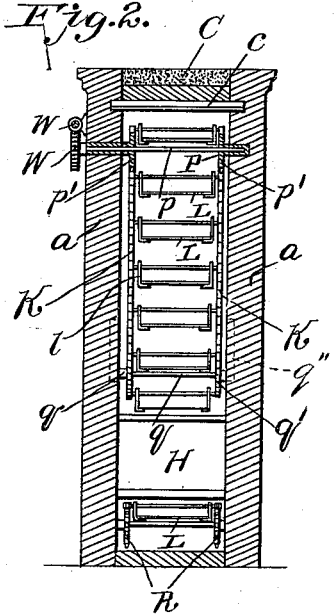
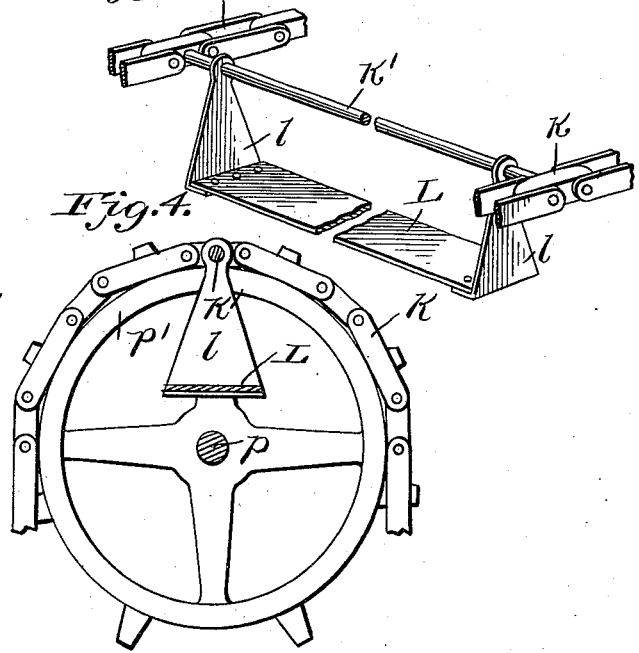
WITNESSES:
Edwin G. McKee
G. M. Anderson
INVENTOR
Louis S. Burbank
BY
E. W. Anderson
his ATTORNEY.

UNITED STATES PATENT OFFICE.

LOUIS S. BURBANK, OF WORCESTER, MASSACHUSETTS, ASSIGNOR, BY MESNE ASSIGNMENTS, TO THE NATURAL FOOD COMPANY, OF NIAGARA FALLS, NEW YORK, A CORPORATION OF NEW YORK.

APPARATUS FOR COOKING AND DRYING.

SPECIFICATION forming part of Letters Patent No. 685,671, dated October 29, 1901.

Application filed December 21, 1899. Serial No. 741,072. (No model.)

*To all whom it may concern:*

Be it known that I, LOUIS S. BURBANK, a citizen of the United States, residing at Worcester, in the county of Worcester and State of Massachusetts, have invented certain new and useful Improvements in Apparatus for Cooking and Drying; and I do hereby declare the following to be a full, clear, and exact description of the invention, such as will enable others skilled in the art to which it appertains to make and use the same.

Figure 1 is a side elevation of my apparatus, partly broken away. Fig. 2 is a section on the line $x\ x$, Fig. 1. Fig. 3 is a detail perspective view of one of my carriages in connection with the sprocket-chain. Fig. 4 is a detail cross-sectional view of same in connection with the sprocket mechanism.

This invention has relation chiefly to means for cooking and drying food material in large quantities; and it consists, mainly, in the novel construction and combination of devices constituting a cooking and drying oven through which the material is passed in conveyers having vertical as well as horizontal continuous movement, as hereinafter set forth.

In the accompanying drawings, illustrating this invention, the letter A designates the wall of the oven, B the floor or base, and C the top, suitably supported by strong beams $c$. The parallel side walls $a\ a$ are comparatively near together, being but a little more distant from each other than the length of the shafting and gearing and sufficiently close to afford bearings for the ends of the shafting beyond the gearing or sprocket-wheels which support the endless carrying chains to which the carriages or swinging shelves are connected. The length of the oven may be according to the requirement of the material and the height about four times the width, more or less.

D represents the partition between the baking-oven E and the drying-chamber F. This partition connects the side walls from the top C downward and terminates a few feet above the floor, being supported by strong iron beams $d$ in such manner that there is provided a low passage-way or opening G below the partition, forming the sole passage or communication between the baking and drying chambers of the oven.

H H indicate the heaters or furnaces, which are supported above the floor or base B by means of suitable girders and arches $h$ in such manner that passages G' are provided between said heaters and the floor or base.

K represents a continuous carrying-belt composed of lateral sprocket-chains $k'$ and shafts $k'$, which extend transversely between the sprocket-chains and are connected to links thereof. The arms $l$ of the carriages L swing on said shafts, always hanging vertically and serving to carry the baking shelves or pans $m$, which are connected to the flanged lower ends thereof.

P P represent the upper set of sprocket-pulleys, each consisting of a shaft $p$ and end sprocket-wheels $p'\ p'$, secured thereon, said shaft being seated to turn in suitable bearings in the side wall near the top of the oven. The ends of these shafts which extend through the side wall are provided with worm-wheels W, which are operated by means of a worm-shaft $w$ to provide a slow regular motion for the carrying-belt and at the same time to hold the sprocket-pulleys and the depending branches of said carrying-belt in proper position, so that no slipping of any portion of the chain in consequence of overweighting can occur.

Q Q indicate the lower set of sprocket-pulleys, each consisting of a shaft $q$ and end sprocket-wheels $q'$. These lower sprocket-pulleys are designed to hang in the depending loops or bights of the carrying-chain K, which form vertical branches in passing over the pulleys P and under the pulleys Q. The sprocket-pulleys Q are steadied by the engagement of the ends of their shafts with guides $q''$ in the opposite side walls. Automatic adjustment is in this manner provided for changes in the length of the shelves caused by variations in the temperature. While the sprocket-pulleys P are located near the top of the oven, both in the baking and in the drying compartments, the lower sprocket-pulleys Q are carried at a level a little above that of the tops of the heaters or furnaces.

R R represent the return sprocket-pulleys, which are arranged in series a little above the main floor and serve to support and carry the chain of carriages back from the delivery end to the feed end of the oven. In the end walls I indicates the feed-opening, arranged at the proper height above the feed-floor, and J the delivery-opening.

S indicates a large sprocket-pulley located in the upper portion of the opening G below the partition D and spanning the same in such manner that the chain of carriages in passing from the baking-compartment E to the drying-compartment F will be carried around the lower end of the partition through said opening.

The heaters or furnaces of the smaller compartment E are sufficient in number or size to produce a high temperature for cooking the material, while those of the larger or drying compartment are designed to produce a much lower degree of heat. It is evident that the feed may be in either direction, so that the material may be first cooked and then dried or first dried and then cooked, and in some cases when a sharp browning is desired at the end of the process the partition may be placed around the delivery end and a baking heat applied. The carrying-chain is operated by suitable worm-gearing, as hereinbefore mentioned, and as its end branch in rising passes the feed-opening the pans of biscuit or other material are laid on the carriages, which convey them upward into the higher heated portion of the baking-compartment, then downward to near the tops of the furnaces, and again upward and downward, and so on until they are passed through the opening G under the partition D into the drying-compartment. Here they are again, through successive elevations and depressions, moved slowly the length of the chamber, finally descending by the end branch of the conveying-chain near the delivery-opening in the end wall, through which the pans are unloaded, the chain continuing downward and back by the return-pulleys to the feed end to be again charged with pans of the food material.

It will be observed that the operation of this baking and drying oven is continuous, and it is so arranged that the preparatory work of forming the material in shape for baking and drying is entirely separated from that portion of the work which has to do with the cooling and packing for transportation.

Having described this invention, what I claim, and desire to secure by Letters Patent, is—

In an oven, the combination of a casing provided with guides, a vertical partition dividing the casing into a drying-chamber and a baking-chamber, said partition being spaced from the bottom of the casing, forming a passage, a series of sprockets in the upper part of the chamber, an endless chain carrying swinging shelves supported by said sprockets and looped within the chambers, a series of sprockets suspended within said loops and operating in said guides, and a plurality of furnaces situated within the lower part of said chambers, the lower part of the endless chain passing below said furnaces, substantially as specified.

In testimony whereof I affix my signature in presence of two witnesses.

LOUIS S. BURBANK.

Witnesses:
ALBERT H. CHAFFEE,
J. R. GILKESON.